(12) United States Patent
Strauel

(10) Patent No.: US 8,277,160 B1
(45) Date of Patent: Oct. 2, 2012

(54) PROTECTIVE WIRE FASTENING APPARATUS

(76) Inventor: Theodore A. Strauel, Bedford Corners, NY (US)

( * ) Notice: Subject to any disclaimer, the term of this patent is extended or adjusted under 35 U.S.C. 154(b) by 562 days.

(21) Appl. No.: 12/111,829

(22) Filed: Apr. 29, 2008

(51) Int. Cl.
*F16B 15/00* (2006.01)

(52) U.S. Cl. ......... 411/475; 411/457; 411/469; 411/923

(58) Field of Classification Search .................. 411/475, 411/457, 469, 921, 923; 248/218.1, 302; 24/703.2, 703.5; 174/159
See application file for complete search history.

(56) References Cited

U.S. PATENT DOCUMENTS

| | | | |
|---|---|---|---|
| 420,635 A * | 2/1890 | Stieringer | 174/159 |
| 2,001,288 A | 4/1935 | Schorr | |
| 2,127,665 A | 8/1938 | Leslie | |
| 2,526,902 A * | 10/1950 | Rublee | 174/159 |
| 3,241,797 A * | 3/1966 | Anderson | 248/71 |
| 3,341,651 A * | 9/1967 | Odegaard | 174/159 |
| 3,599,686 A | 8/1971 | Peebles | |
| 3,682,213 A * | 8/1972 | Litz | 81/44 |
| 4,127,250 A * | 11/1978 | Swick | 248/71 |
| 4,422,489 A * | 12/1983 | Ross | 81/44 |
| 4,573,469 A * | 3/1986 | Golden et al. | 606/220 |
| 4,697,045 A * | 9/1987 | Beatty | 174/159 |
| D293,648 S | 1/1988 | Smirne | |
| 4,843,923 A * | 7/1989 | Voss | 81/44 |
| 4,903,920 A * | 2/1990 | Merritt | 248/71 |
| 4,966,056 A * | 10/1990 | Miller | 81/44 |
| D330,699 S | 11/1992 | Gill | |
| 5,314,160 A | 5/1994 | Larsen | |
| 5,393,184 A | 2/1995 | Beeuwkes, III | |
| 5,529,451 A | 6/1996 | Bruins et al. | |
| 5,809,723 A | 9/1998 | Keith et al. | |
| 5,933,894 A * | 8/1999 | Bates | 7/164 |
| 6,530,803 B1 * | 3/2003 | Chen | 174/159 |
| 6,854,945 B2 | 2/2005 | Humphrey et al. | |
| 7,118,318 B2 * | 10/2006 | Ryals et al. | 411/475 |
| 7,546,988 B1 * | 6/2009 | Schecter | 248/73 |
| 7,874,778 B1 * | 1/2011 | Derrig et al. | 411/457 |
| 2006/0198718 A1 * | 9/2006 | Chen | 411/475 |

* cited by examiner

*Primary Examiner* — Victor Batson
*Assistant Examiner* — Roberta Delisle
(74) *Attorney, Agent, or Firm* — Mannava & Kang, P.C.

(57) ABSTRACT

An apparatus for protecting and fastening a wire to a mounting object includes a molded unibody having a first section connected to a second section, wherein the first section includes a surface that operates to receive a fastener, such as a staple, therethrough to secure the wire in place against the mounting object, and the second section protrudes from the surface of the first section and extends away from the surface of the first section for a user to safely hold the first section in place as the user mounts the apparatus and the wire to the mounting object.

15 Claims, 6 Drawing Sheets

PROTECTIVE WIRE FASTENING APPARATUS

FIELD OF THE INVENTION

The present invention relates to devices for retaining a wire (or cable) to a structure or mounting object. More particularly, the present invention relates to an apparatus or device for retaining a wire (or cable) to a structure or mounting object while protecting or maintaining an insulation of the wire and providing safety to the user mounting the wire.

BACKGROUND

Wires such as electrical flat wires or cables are used in construction and other building projects to run electricity and other electrical connections therein. In such projects, fasteners (e.g., staples, nails, etc.) are used by workers (e.g., construction workers, electricians, etc.) to mount the wires to structures or other mounting objects. The wires must be mounted and retained in a proper manner to preserve the integrity and insulation of the wires for electrical performance and fire safety reasons. Also, because wires are typically run over long distances, for example, throughout a building under construction, workers often must use hundreds, if not thousands, of fasteners to secure the wires along the way. The repeated task of installing or mounting wires with fasteners exposes workers to the risk of personal injury. For example, workers may accidentally drive fasteners into their fingers instead of the wall studs or hammer strike their fingers instead of the fasteners.

There exist a number of products in the construction and home improvement industries for use to protect wires during their installation. For example, companies such as Ideal™, Arrow Faster Co.™, and King Manufacturing Co., Inc.™ offer staples with plastic (e.g., polyethylene) insulators attached thereto to form insulated staples. That is, each insulated staple is formed by inserting a staple through holes or openings in the plastic insulator, which interfaces between the staple and a wire, to insulate the wire as it is secured to a mounting object by the staple. U.S. Design Pat. No. D330,699, assigned on its face to W. W. Cross, Inc. illustrates an example of a conventional insulated staple. The plastic insulator also may serve as a handle for holding with a user's thumb and forefinger as the user drives the staple (e.g., with a hammer) to a mounting object, such as a construction frame or wall stud. However, the conventional insulated staple does not have sufficient room on its plastic insulator for a user (e.g., a worker) to properly but safely hold the insulated staple for driving it to a mounting object. Thus, typically, a part of the user's thumb and/or finger is exposed over the staple area and subjected to the driving force (e.g., a hammering force) that the user employs to drive the staple to the mounting object. Consequently, the user risks personal injury as the user repeatedly mounts insulated staples to secure the installation of a wire along its length.

Accordingly, there is a desire for a wire protector and fastener that provides added safety to its users.

SUMMARY

Accordingly, embodiments of the present invention provide an apparatus or mechanism for an insulated or protective fastener that is operable to fasten or mount a wire to a mounting object while protecting the integrity of the wire and also providing added safety to the user.

In one embodiment, there is provided an apparatus for protecting and fastening a wire to a mounting object, the apparatus comprising a first section having a first surface and at least one opening through the first surface, a second section connected to one end of the first section so as to provide a handle for holding the first section in place, wherein the second section protruding from the first surface of the first section so that it is used to hold the first section in place, and a fastener operating to secure the apparatus to the mounting object via an insertion of the fastener through the at least one opening in the first section.

In another embodiment, there is provided an apparatus for protecting a wire to be fastened to a mounting object, the apparatus comprises a molded unibody construction having a first section connected to a second section, wherein the first section includes a surface that operates to receive a fastener therethrough to secure the wire in place against the mounting object, and the second section protrudes from the surface of the first section and extends away from the surface of the first section for holding the first section in place as the apparatus is mounted to the mounting object.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
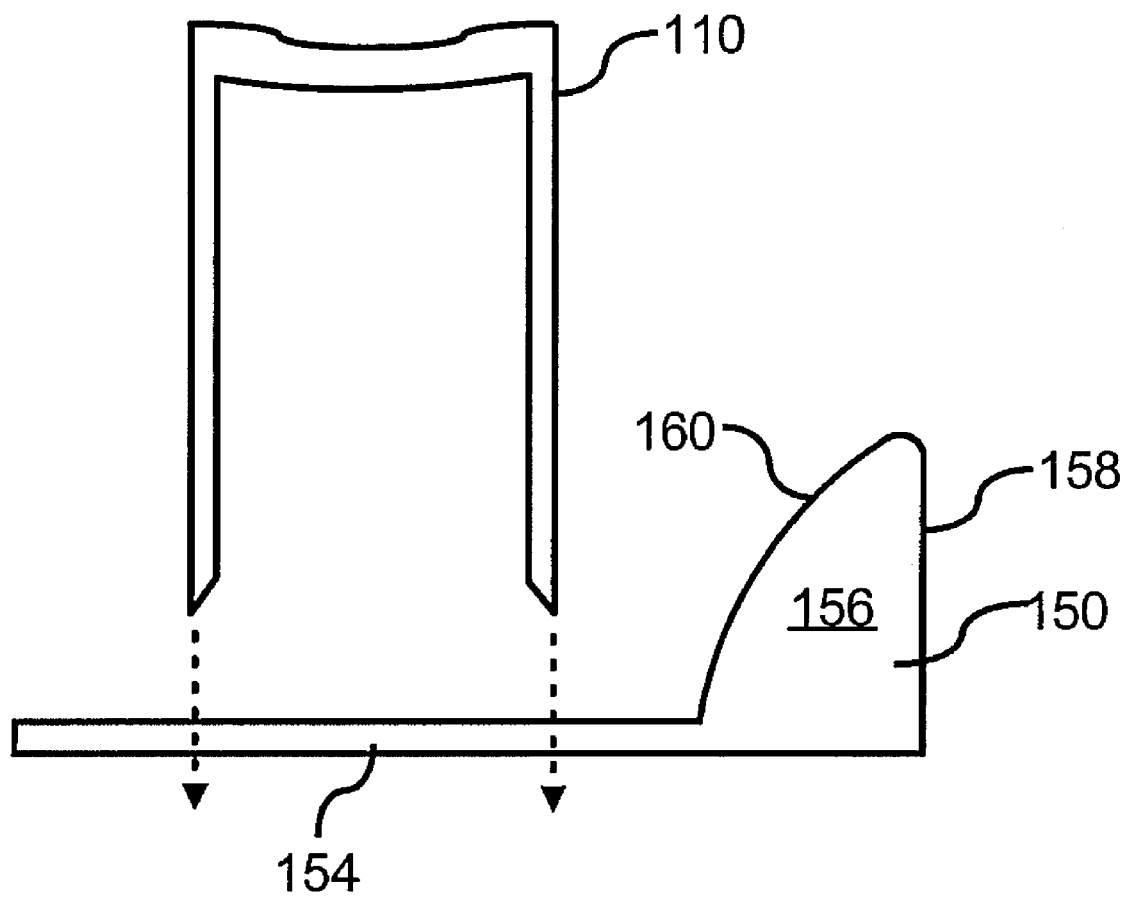
FIG. 1 illustrates a side view of an apparatus 100 for an insulated or protective fastener for protecting and fastening a wire to a mounting object, in accordance with one embodiment.
Figure 2A:
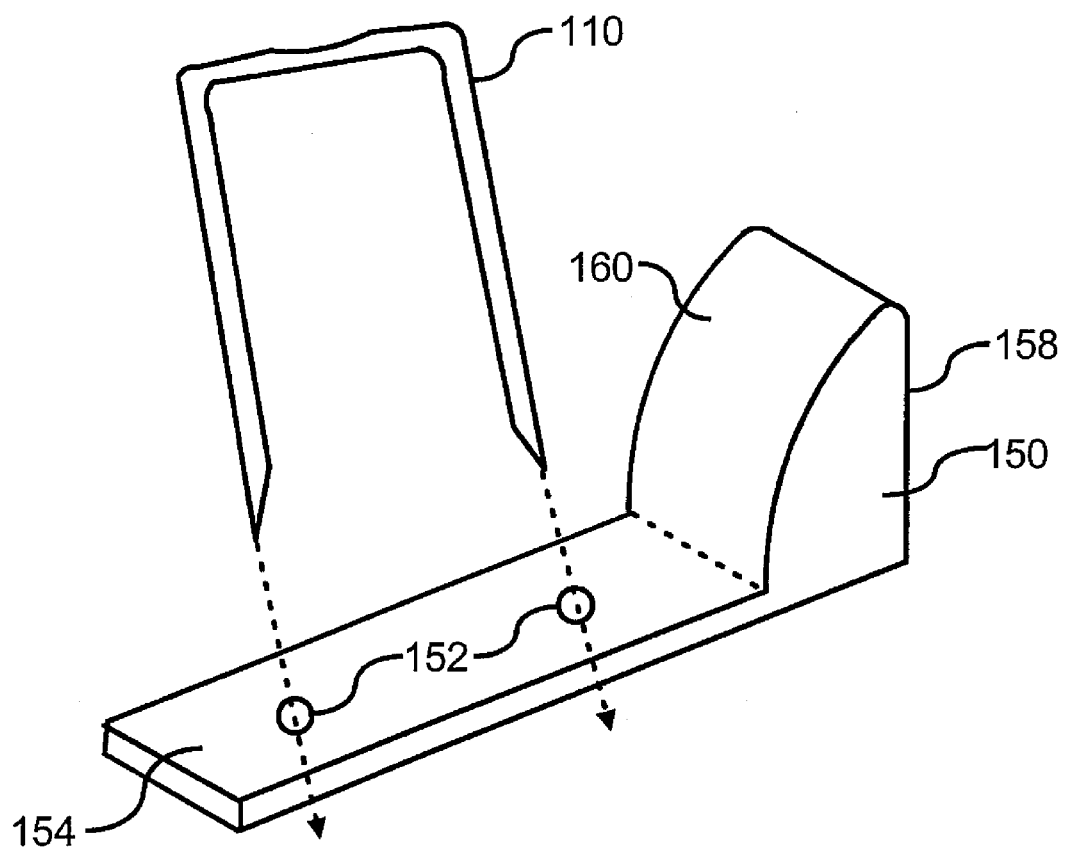
FIGS. 2A-B illustrate a top view of an insulating device in an apparatus for an insulated and protective fastener, in accordance with various embodiments.
Figure 3:
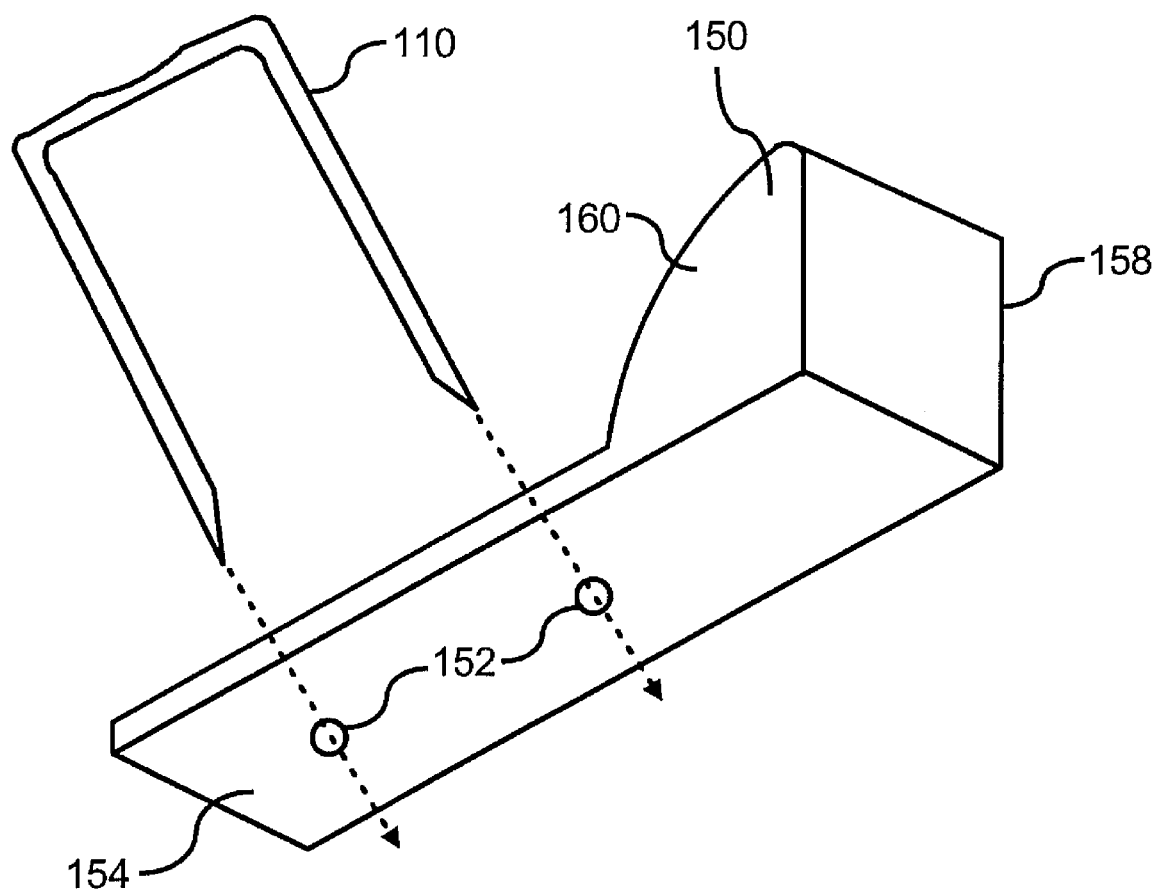
FIG. 3 illustrates a bottom view of an insulating device in an apparatus for an insulated and protective fastener, in accordance with one embodiment.

FIG. 1 illustrates a side view of an apparatus 100 for an insulated or protective fastener for protecting and fastening a wire to a mounting object, in accordance with one embodiment. The protective wire fastening apparatus 100 includes a fastener 110, such as a staple, and an insulating device 150 that provides protection or insulation of a wire underneath thereof from the fastener 110. As illustrated by the dashed arrow lines, the staple 110 may be inserted through the insulating device 150 via holes, apertures, or openings (not shown) in the latter. FIGS. 2A and 3 illustrate additional views of the protective fastener 100 to further illustrate the top (FIG. 2A) and bottom (FIG. 3) views of the insulating device 150. As illustrated, the fastener 110 may be inserted through the holes, apertures, or openings 152 in the insulating device.

Figure 2B:
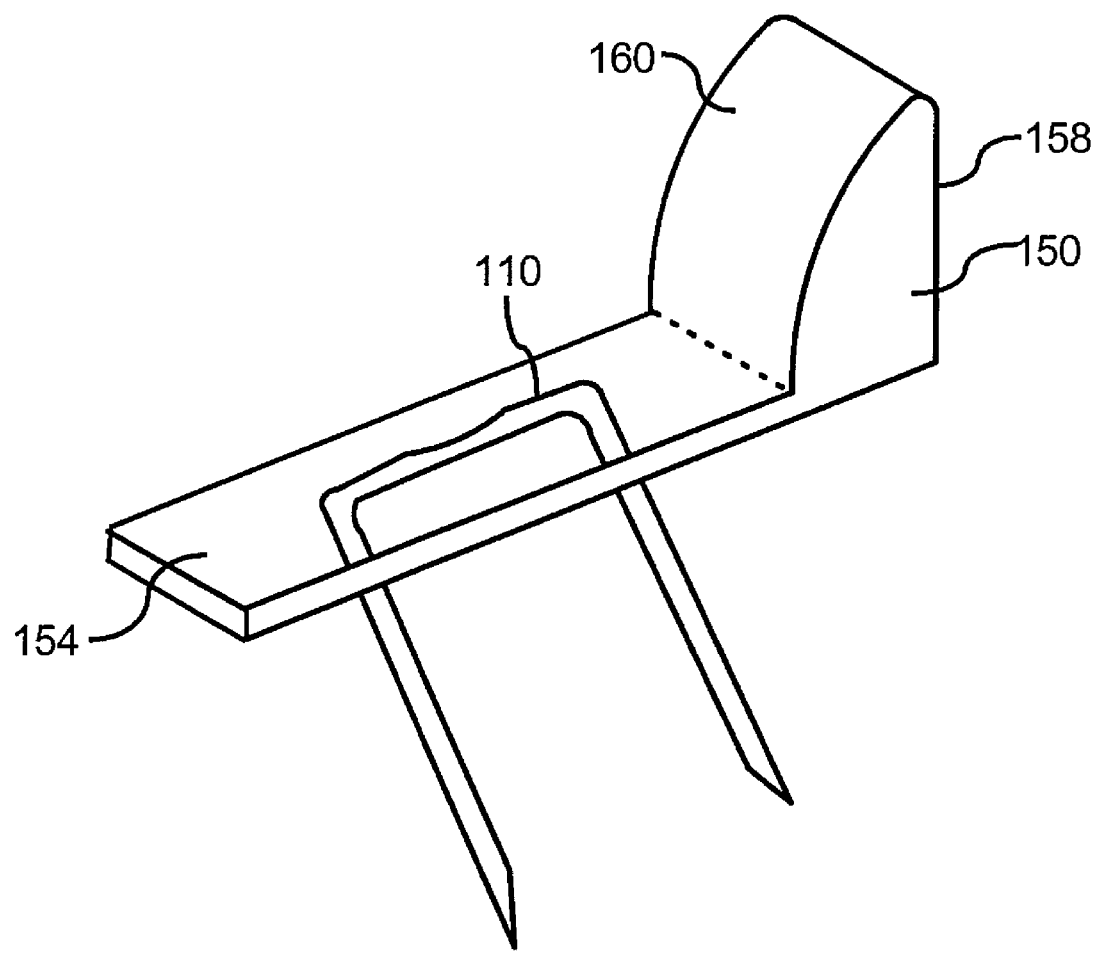

FIGS. 1, 2A, and 3 illustrate an embodiment wherein the fastening apparatus 100 includes 2 separate components, a fastener 110 and an insulating device 150. FIG. 2B illustrates another embodiment, wherein the fastening apparatus 100 with the fastener portion 110 and the insulating portion 150 integrated together as a single unit.

The insulating device 150 may be molded or otherwise made from any material that is suitable to provide a protective buffer between the fastener 110 and a wire to be mounted and retained in place by the protective fastener 110. This protective buffer helps to insulate and maintain the integrity and electrical performance of the wire as the wire is being mounted or secured to an object with the apparatus 100. Thus, the insulating device 150 may be molded or otherwise made from polyethylene or other types of plastic compound, an elastic polymer such as rubber, or any other polymeric material that is sufficiently hard to protect the wire to be secured between the insulating device 150 and a mounting object.

The insulating device 150 has a driving or striking section 154 and a handle section 156. The driving portion 154 includes the holes 152 for insertion of the fastener 110. The driving section 154 also serves as a target for a user to drive or strike the protective wire fastening apparatus 100 in order to mount it to an object for securing a wire against the object, in between the insulating device 150 and the object. For example, the user may use a hammer to strike the faster 110 through the holes 152 and into the object to mount the protective wire fastening apparatus 100 and wire to the object. As illustrated in FIGS. 1-3, the driving section 154 has a flat rectangular shape. However, alternative embodiments are contemplated wherein the driving section 154 may be of any desired flat shape to accommodate the molding or manufacturing of the insulating device and/or its practical application for a particular building or construction project.

The handle section 156 of the insulating device 150 is attached to one end of the driving section 154 to form a unibody construction of the insulating device 150. The handle section 156 protrudes out from a first surface of the driving section 154 so that it may be held by the user, for example, using the user's thumb and forefinger, to hold the driving section 154 in place as the user strikes the driving section 154 to drive the insulating device 150 and wire against a mounting object, such as a wall stud. The wire makes contact with a second surface of the driving section 154 that opposes the first surface such that when the insulating device 150 and wire are mounted against the mounting object, the wire is secured between the mounting object and the underside of the driving section 154. Thus, as illustrated in FIGS. 1-3, a surface of the handle section 156 intersects with the surface of the driving section 154 at a sufficient distance away from the holes 152 and fastener 110 therethrough (e.g., at the end of the driving section 154) to prevent injury to the user holding the insulating device 150.

FIGS. 1-3 illustrate an example wherein the handle section 156 includes one side 158 that is substantially perpendicular to the surface of the driving section 154 and an opposing side 160 that is curved away from the fastener 110. However, alternative embodiments are contemplated wherein the handle section 156 may be of any desired shape that protrudes from the surface of the driving section 154 and extends away from the fastener 110 to accommodate the molding or manufacturing of the insulating device 150 and provide protection to the user holding the apparatus 100. For example, the handle section 156 may have a hole or an opening therethrough the sides 158 and 160 for ease of manufacturing of the device 150 (for example, for retrieval of the device 150 after molding).

Figure 4A:
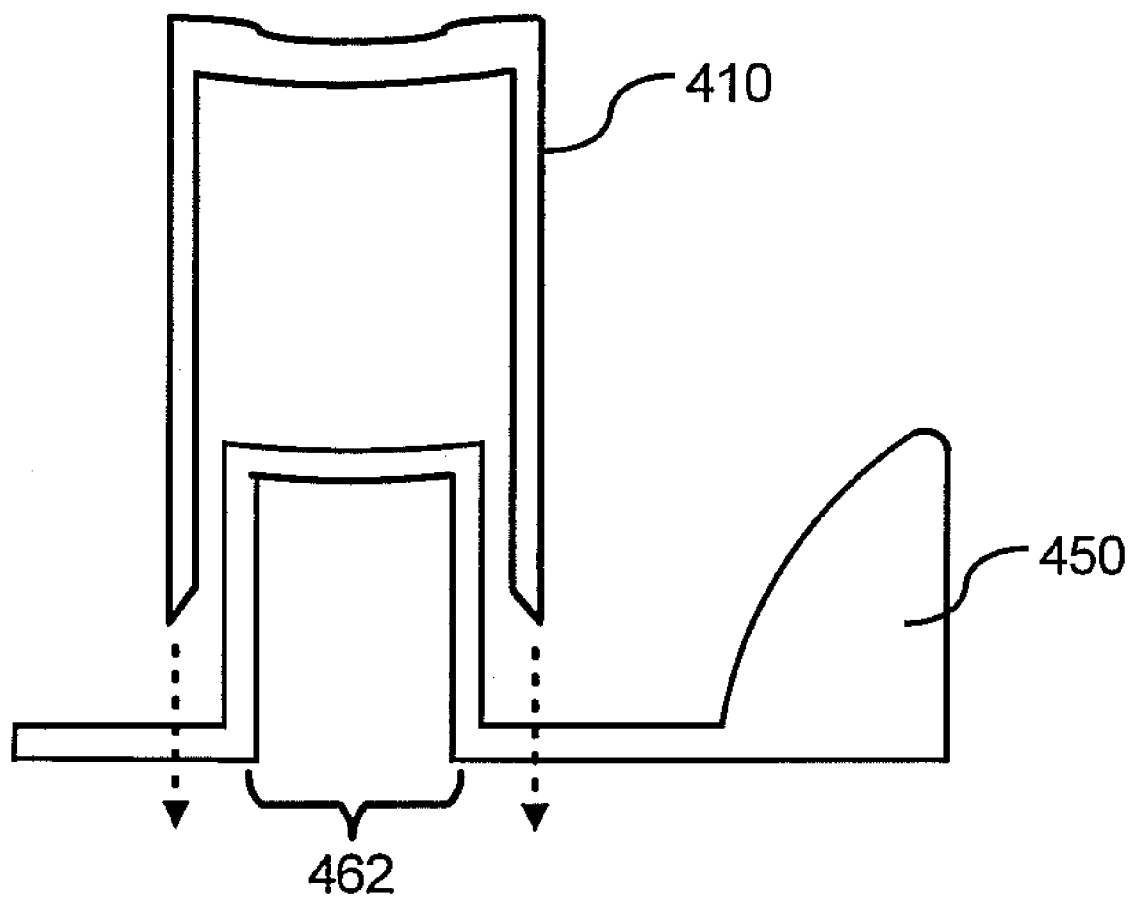
FIGS. 4A-B illustrates an insulating device in an apparatus for an insulated and protective fastener, in accordance various embodiments.

FIG. 4A illustrates another embodiment of an insulating device 450 that may be used in lieu of the insulating device 150 for a protective wire fastening apparatus 400. The insulating device 450 also has a driving section 454 and a handle section 456. The handle section 456 is similar to the handle section 156 of the insulating device 150 as described above. The driving section 454 is similar to the driving section 154 of the insulating device 150 as described above, except that the driving section 454 further includes a portion 462 that is contoured along the shape of the fastener 110. The contour portion 462 is positioned in between the holes for inserting the fastener 110 into the insulating device 450 and enables the insulating device 450 to further insulate the wire, which runs below this portion, from the fastener 110 that is located above this contour portion. In one embodiment, the height of the contour portion 462 is substantially ¼, or a quarter of, the height of the handle section of the insulating device 450. However, alternative embodiments are contemplated wherein the contour portion 462 may be of any height as desired. For example, the insulating device 450 may be manufactured with the contour portion 462 having a particular height to accommodate a particular wire size (or gauge).

Figure 4B:
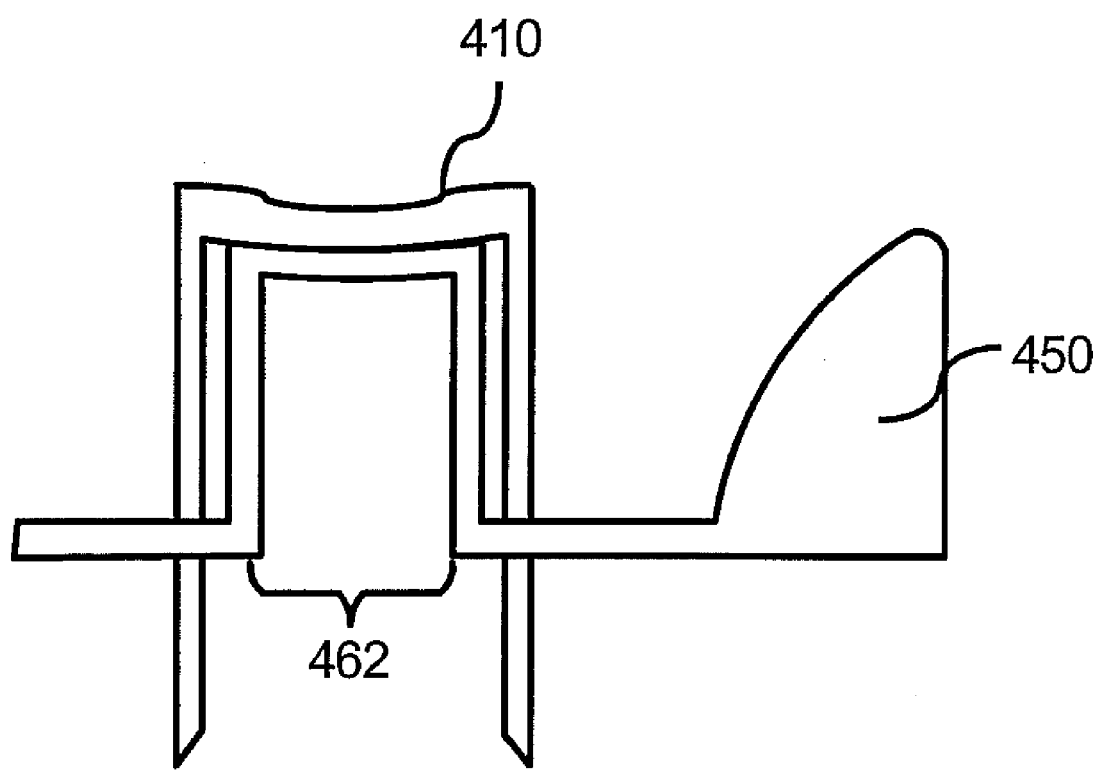

As with FIG. 2B, FIG. 4B illustrates another embodiment of the fastening apparatus 400 wherein the fastener 110 and insulating device 450 are integrated together as a single unit.

FIGS. 1-4 illustrate the fastener 110 as a staple with two legs set apart by a desired distance, such as one standardized in the home improvement and construction industries for wire staples, wherein each leg has a sharp end for mounting to a mounting object. However, alternative embodiments are contemplated, wherein other types of fastener, such as nail, tack, pin, spike, etc., may be used in lieu of the staple. For example, instead of a staple, one or more nails may be inserted into the holes or openings in the insulating device 150 (or 450).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. An apparatus for protecting and fastening a wire to a mounting object, the apparatus comprising:
    a first section having a first surface, a second surface opposing the first surface, at least one opening extending from the first surface to the second surface, a free first end and a second end opposing the first end, wherein the second surface is operable to abut at least one of the wire and the mounting object, wherein the first section is formed of a polymeric material configured to operate as a protective buffer between a fastener and the wire; and
    a second section connected to the second end, the second section protruding above the first surface of the first section, said second section having a rounded apex and being composed of a curved surface that faces, extends from and is connected to the first surface of the first section and a substantially flat surface that faces away from the first section, said curved surface being connected to the substantially flat surface near the apex, and said substantially flat surface extending substantially vertically from near the apex and extending into a bottom surface of the second section that is connected to and is contiguous with the second surface along a common plane, said second section also comprising a pair of opposing side walls, wherein each of the opposing side walls covers an area extending between the curved surface, the substantially flat surface, and the bottom surface of the second section, and wherein the first end of the first section is at a substantially lower height than the apex of the second section.

2. The apparatus of claim 1, wherein the second section extends away from the first end of the first section.

3. The apparatus of claim 1, wherein the second section is sized to be held between a thumb and a forefinger.

4. The apparatus of claim 1, wherein the first section and the second section together form a unibody construction of an insulating device.

5. The apparatus of claim 4, wherein the fastener is insertable into the insulating device via the at least one opening through the first surface of the first section.

6. The apparatus of claim 4, wherein the fastener is integrated with the unibody construction of the insulating device to form a single unit.

7. The apparatus of claim 4, wherein the insulating device is a molded unibody construction of the polymeric material.

8. The apparatus of claim 1, wherein the first section is operable to receive the fastener through the at least one opening in the first surface of the first section.

9. The apparatus of claim 1, wherein the first section includes a contour portion that contours along a shape of the fastener, said contour portion extending above the first surface of the first section, and wherein the contour portion is configured to provide a space for the wire to be positioned beneath the first section without substantially causing the first section to bend.

10. The apparatus of claim 9, wherein the first section includes two openings extending through the first surface to the second surface, and wherein the contour portion of the first section is positioned between the two openings.

11. The apparatus of claim 1, wherein the first section includes at least two openings, and wherein the fastener is a staple having two legs that are configured to be inserted through the at least two openings to hold the wire therebetween and wherein the portion between the two legs of the staple is configured to abut the first surface of the first section when inserted through the at least two openings.

12. An apparatus for protecting a wire to be fastened to a mounting object, the apparatus comprising:
a molded unibody construction having a first section connected to a second section, wherein the first section includes a first surface, a second surface opposing the first surface, and at least one opening extending from the first surface to the second surface, a free first end and a second end, wherein a fastener is configured to be placed through the at least one opening from the first surface, and wherein the second surface is configured to secure the wire in place against the mounting object, wherein the first section is configured to operate as a protective buffer between the fastener and the wire, and wherein the second section is connected to the second end of the first section and protrudes from the first surface of the first section and extends away from the first surface of the first section, said second section having an apex and being composed of a curved surface that faces, extends from and is connected to the first surface of the first section and a substantially flat surface that faces away from the first section, said curved surface being connected to the substantially flat surface near the apex, and said substantially flat surface extending substantially vertically from near the apex and extending into a bottom surface of the second section that is connected to and is contiguous with the second surface along a common plane, said second section also comprising a pair of opposing side walls, wherein each of the opposing side walls covers an area extending between the curved surface, the substantially flat surface, and the bottom surface of the second section, wherein the first end of the first section is at a substantially lower height than the apex of the second section, and wherein the first section is configured to hold the wire against the mounting object to maintain a position of the wire with respect to the mounting object.

13. The apparatus of claim 12, wherein the fastener is one of a staple, a nail, a pin, a tack, a pin, and a spike that is inserted through the at least one opening in the first surface of the first section.

14. The apparatus of claim 12, wherein the first section of the molded unibody construction includes a portion that contours with a shape of the fastener that is received through the surface of the first section, and wherein the contour portion is configured to provide a space for the wire to be positioned beneath the first section without substantially causing the first section to bend.

15. An apparatus for protecting a wire to be fastened to a mounting object, the apparatus comprising:
a molded unibody construction having a first section connected and integrated with a second section, wherein the first section includes a first surface and at least one opening in the first surface, said first section further having a fastener integrated with the first section and inserted in the at least one opening to secure the wire in place against the mounting object, wherein the first section is formed of a polymeric material configured to operate as a protective buffer between the fastener and the wire, and the second section protrudes from the first surface of the first section and extends away from the first surface of the first section, said second section having an apex and being composed of a curved surface that faces, extends from and is connected to the first surface of the first section and a substantially flat surface that faces away from the first section, said curved surface being connected to the substantially flat surface near the apex, and said substantially flat surface extending substantially vertically from near the apex and extending into a bottom surface of the second section that is connected to and is contiguous with the second surface along a common plane, said second section also comprising a pair of opposing side walls, wherein each of the opposing side walls covers an area extending between the curved surface, the substantially flat surface, and the bottom surface of the second section, wherein the first end of the first section is at a substantially lower height than the apex of the second section and wherein the first section of the molded unibody construction includes a portion that contours with a shape of the fastener that is received through the surface of the first section and wherein the contour portion is shaped to provide a space for the wire to be positioned beneath the first section without substantially causing the first section to bend.

* * * * *